United States Patent [19]

Bernhard

[11] 4,456,486
[45] Jun. 26, 1984

[54] YELLOW NACREOUS PIGMENTS HAVING CALCINED CR OXIDE AND PHOSPHATE LAYER FOR IMPROVED LIGHT-FASTNESS, PROCESS AND USE

[75] Inventor: Horst Bernhard, Schwarzenberg, Austria

[73] Assignee: Merck Patent Gesellschaft mit beschränkter Haftung, Darmstadt, Fed. Rep. of Germany

[21] Appl. No.: 421,741

[22] Filed: Sep. 22, 1982

[30] Foreign Application Priority Data

Sep. 23, 1981 [DE] Fed. Rep. of Germany ....... 3137808

[51] Int. Cl.$^3$ ................................................ C09C 1/00
[52] U.S. Cl. .................... 106/291; 106/302; 106/308 B; 424/63
[58] Field of Search ................... 106/291, 300, 308 B, 106/302

[56] References Cited

U.S. PATENT DOCUMENTS

| 3,087,828 | 4/1963 | Linton | 106/291 |
| 3,087,829 | 4/1963 | Linton | 106/291 |
| 3,127,280 | 3/1964 | Whatley | 106/308 B |
| 3,342,617 | 9/1967 | Jackson | 106/291 |
| 3,832,208 | 7/1974 | Jackson | 106/308 Q |
| 3,926,659 | 12/1975 | Bernhard et al. | 106/291 |
| 4,086,100 | 4/1978 | Esselborn et al. | 106/291 |
| 4,134,776 | 1/1979 | Rieger et al. | 106/291 |

FOREIGN PATENT DOCUMENTS

| 2605651 | 8/1977 | Fed. Rep. of Germany | 106/302 |
| 2936746 | 3/1981 | Fed. Rep. of Germany . | |
| 1279672 | 6/1972 | United Kingdom | 106/300 |

*Primary Examiner*—Helen M. McCarthy
*Attorney, Agent, or Firm*—Millen & White

[57] ABSTRACT

Nacreous pigments having a yellow powder color and an improved light-fastness comprise a mica platelet coated with titanium dioxide and on the titanium dioxide layer, a thin layer of calcined chromium oxide and/or chromium phosphate as a protective layer. The pigments are produced by coating mica platelets coated with metal oxides and/or hydroxides, with a thin layer of a sparingly soluble chromium(III) compound and calcining at about 500°–1000° C.

11 Claims, No Drawings

YELLOW NACREOUS PIGMENTS HAVING CALCINED CR OXIDE AND PHOSPHATE LAYER FOR IMPROVED LIGHT-FASTNESS, PROCESS AND USE

BACKGROUND OF THE INVENTION

The present invention relates to nacreous pigments having a yellow powder color (e.g., generally wavelengths of 530-590 nm) and improved light-fastness and which are based on mica flakes which are coated with titanium dioxide and to which an additional coloring protective layer has been applied.

It is known, not only from German Pat. No. 1,467,468 but also from German Offenlegungsschrift No. 2,852,585, that an additional thin chromium hydroxide layer on mica platelets coated with titanium dioxide effects an improvement in the stability to light of the base pigments. While German Pat. No. 1,467,468 describes the beneficial influence of a chromium hydroxide coating on mica coated with $TiO_2$ in anatase form, German Offenlegungsschrift No. 2,852,585 describes the analogous influence on mica coated with $TiO_2$ in rutile form. The two patents aim at obtaining uncolored $TiO_2$/mica pigments.

However, even these improved pigments are not fully satisfactory, since there has still been a demand for pigments having improved light-fastness. There is, in particular, a demand for light-fast nacreous pigments having a deep golden luster (pearlescence) and, in addition but also in general, for pigments having a yellow powder color and optional interference colors.

SUMMARY OF THE INVENTION

It is an object of this invention to provide such pigments and a process for their preparation.

Upon further study of the specification and appended claims, further objects and advantages of this invention will become apparent to those skilled in the art.

It has now been found that an improvement in the light-fastness of $TiO_2$-containing mica pigments is effected not only by a coating with chromium hydroxide but also by means of other sparingly soluble chromium-(III) compounds. In addition, on the one hand, a further considerable improvement in light-fastness is effected, in particularly, by a further calcination of pigments coated with a chromium(III) compound; and on the other hand, very advantageous pigments having a yellow powder color are produced due to the deeply yellow-colored chromium titanate formed on calcination.

The invention therefore relates to nacreous pigments having a yellow powder color and improved light-fastness and which are based on mica flakes which are coated with titanium dioxide, there being an additional coloring protective layer on the titanium dioxide wherein a thin layer of calcined chromium oxide and/or chromium phosphate is the protective layer.

The invention also relates to a process for preparing these pigments and to their use.

DETAILED DISCUSSION

Although it has been known for about 20 years that an improvement in the light-resistance of yellow mica/-$TiO_2$ pigments can be obtained by means of a chromium hydroxide coating, an additional calcination of the pigments coated with chromium(III) has hitherto not been considered. Yet, surprisingly, particularly advantageous pigments, which are impressive because of their light-fastness as much as their yellow powder color, are obtained precisely through this additional calcination. In particular, in the case of preparations having a yellow interference color, brilliantly lustrous gold pigments can be obtained.

In the prior art, calcination of Cr(III)-containing layers is known but not on yellow-powder colored pigments. Since $Cr_2O_3$ is per se green, it was not heretofore realized that calcination of Cr(III)-containing layers could be employed in conjunction with the yellow pigments of this invention in order to provide desired light-fastness and, simultaneously, retention of desired yellow, particularly golden, color.

To prepare pigments according to this invention, mica platelets are first coated in a customary manner with $TiO_2$ and, if appropriate, also with other metal oxides. These mica flake pigments used as base pigments are as a rule mica flakes having a diameter of about 5–200 μm and a thickness of about 0.1–5 μm and which are coated with a metal oxide layer. Because of their advantageous refractive indices, the metal oxide coatings are mainly titanium dioxide or titanium dioxide hydrates and/or zirconium dioxide or zirconium dioxide hydrates. However, other colorless or, if desired, also colored metal oxides, such as, for example, $SnO_2$, $Al_2O_3$ and $Fe_2O_3$, can also be used together with or as alternatives to these metal oxides. An example of a pigment which is used particularly frequently is a mica flake pigment in which mica flakes having a diameter of about 5–50 μm and a thickness of about 0.5 μm are evenly coated with an optionally hydrated titanium dioxide layer, the mica surface carrying a $TiO_2$ layer of about 50–500 mg of $TiO_2$ per $m^2$. These nacreous pigments, depending on the thickness of the metal oxide layer precipitated onto them, have various interference colors. All these pigments are known and have been described, for example in German Patents and Patent Applications Nos. 1,467,468, 1,959,998, 2,009,556, 2,060,850, 2,106,613, 2,214,545, 2,215,191 and 2,522,572, all of whose disclosures are incorporated by reference herein. Pigments having a yellow interference color are particularly preferred. The aftertreatment with chromium compounds leads in these cases to brilliant golden pigments which in their pure hue differ in an extremely advantageous manner from the existing reddish golden pigments containing iron oxide.

As a rule, the base pigments are products which are calcined at elevated temperatures of about 600°–1,000° C. However, it has been found that very good results are also obtained when the chromium(III) layer is applied immediately after the coating of the mica with the other metal oxides and calcination is only then carried out. This simpler process requires only a single calcination stage. It produces pigments which differ in a favorable manner from those of the state of the art but which, as a rule, do not quite measure up to the quality of pigments calcined twice, i.e., after the coating with metal oxide and after the coating with chromium(III). The pigments prepared in this process even when carried out in one calcination stage, and hence inexpensive, are nevertheless completely adequate for certain applications and therefore preferable for these applications. In any case, the significant point is that the pigment is calcined after having been coated with the chromium-(III) compound.

Particularly preferable base pigments are the rutile/-mica pigments known from German Offenlegungsschrift No. 2,522,572, which have a layered structure which is built up by first precipitating a thin $TiO_2$ film and thereafter, in an alternating manner, at least the sequence $SnO_2/TiO_2$ onto the mica surface, and which are then calcined at a temperature up to about 1,000° C. However, these preparations, like other base pigments, can also be used in the non-calcined state. The rutile structure then forms in the calcination of the products coated with the sparingly soluble chromium compound.

To apply the chromium(III)-containing layer, the base pigment, which has the interference color desired, is suspended in an aqueous solution and coated with chromium hydroxide and/or chromium phosphate. The conditions for this coating step can be varied within wide ranges. It is merely desirable that the sparingly soluble chromium(III) compound formed in the suspension by chemical reaction, hydrolysis or reduction, be produced at a rate which is such that the compound can be continuously deposited on the pigment surface without significant amounts of free nuclei being formed in the suspension. The thickness of the chromium-containing layer can be conventionally and readily controlled by control of the amount of chromium in the solution and the time of deposition, perhaps in view of a few routine preliminary tests.

The sparingly soluble chromium(III) compound can be formed not only from chromium(III) salts but also by starting with chromium(VI) compounds. When starting with chromium(III) salts, it is possible either for the pigment suspension to contain the ions required for the precipitation (hydroxyl and/or phosphate ions), in which case a chromium(III) salt solution is slowly added, or for hydroxyl and/or phosphate ions to be slowly added to a pigment suspension containing a chromium(III) salt. However, it is also possible simultaneously to add not only a chromium salt solution but also a solution containing the precipitating ions to the pigment suspension. During this addition, a constant pH value is as a rule maintained. Alternatively, the ions necessary for the precipitation can be formed by chemical reaction, such as, for example, homogeneous hydrolysis, in the pigment suspension containing the chromium salt.

However, chromium(III) ions can also be formed in situ from chromium(VI) compounds. For this purpose, a chromium(VI) salt solution is mixed into the pigment suspension together with a reducing agent, such as, for example, hydrazine or hydroxylamine, either by one component being initially introduced and the other added or both components being simultaneously and slowly added to the pigment suspension.

The pH value in the pigment suspension should be above about 3, values of between 4.5 and 9 being preferred. To set the pH value, which, on the sole addition of the acidic chromium(III) salt solution, would be in the strongly acid range, any base can in principle be used. The following are mentioned by way of example: ammonia (in solution or as a gas), sodium hydroxide solution or potassium hydroxide solution. Ammonia is preferred.

To provide chromium(III) ions, any soluble chromium(III) salt or chromate(VI) salt can in principle be used. $CrCl_3$ or chrome alum solutions or potassium dichromate are preferably used. If a phosphate precipitation is to be effected, not only orthophosphoric acid but also its primary, secondary and tertiary salts as well as polymeric phosphates can be used. Suitable examples, in addition to phosphoric acid, include $KH_2PO_4$, $Na_2HPO_4 \times 12H_2O$, $Na_3PO_4 \times 12H_2O$, $Na_4P_2O_7 \times 7H_2O$ and $(NaPo_3)x$.

The precipitation can in principle be carried out at any temperature between the freezing point and the boiling point of the suspension. However, it has been found that secondary precipitation can occur at relatively low temperatures. It is therefore preferable to operate at an elevated temperature, for example about 50°-100° C., in particular about 50°-90° C. However, qualitatively good precipitations are as a rule obtained even at other temperatures.

It is not necessary that a pure chromium hydroxide or chromium phosphate precipitate be formed on the pigment particles. Not only mixtures of chromium hydroxide with chromium phosphate but also there can be applied mixtures containing other, preferably colorless metal oxides, which are applied either at the same time as the chromium compound or, in a thin layer, before or after it.

It is also possible for the precipitates formed to be altered in their chemical composition by subsequent reactions. Thus, for example, a chromium hydroxide precipitate, by treatment with phosphate-containing solutions of the pigment particles onto which the chromium hydroxide has been coated, can be partially or completely converted into chromium phosphate without the coating losing its effectiveness.

To obtain the improvement according to the invention in light-fastness, relatively small amounts of chromium compound are sufficient. The full stabilizing effect is already detectable at a content of 0.5% by weight (calculated as $Cr_2O_3$ and relative to the total weight of the pigment). With increasing content of chromium, an enhanced saturation of the golden shade produced is then obtained after calcination and can be used to obtain very pretty effects. At a chromium content above about 4% by weight, the total amount of chromium cannot completely be converted with titanium dioxide into the yellow chromium titanate, but some remains, for example as chromium oxide, which manifests itself by a green tint in the powder color of the pigments. Although this can be used for special effects, it is as a rule not desirable within the scope of the present invention, in which there is desired an improvement in light-fastness and at the same time pigments having a yellow powder color, in particular brilliant golden pigments. Pigments according to this invention therefore preferably have a content of about 0.2-3% by weight of chromium compound, calculated as $Cr_2O_3$. Such amounts readily permit the chromium compound to function to provide light-fastness in a pigment of yellow hue and yet not impart an overall green powder color to the pigment.

After the base pigment have been coated with chromium hydroxide and/or chromium phosphate, the pigments are processed in a customary manner. For this purpose, they, as a rule, are filtered off, washed and dried. In contrast to the known aftertreatment involving coating with chromium hydroxide, this is then, however, followed by a calcination at temperatures of about 500 to about 1,000° C., preferably about 700° to about 900° C. In this calcination, which is customarily carried out for about a half to one hour, any chromium hydroxide present and other hydroxides and hydrates are dehydrated and the reaction with $TiO_2$ produces the brilliant yellow pigment color.

The pigments thus obtained, in addition to this attractive golden shade, have a markedly improved light-fastness compared with non-calcined pigments prepared according to the state of the art, so that valuable new pigments are obtained by means of the invention. The pigments according to this invention can be used in the same way as existing ones, that is, for example, as an additive to plastics, inks or paints, but particular also in body-care agents and cosmetics. Owing to their improved light-fastness, any applications in which the pigments are exposed to environmental influences, in particular, for example, in car paints, are also preferred.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

EXAMPLE 1

120 g of a mica pigment which, in the process of German Offenlegungsschrift 2,522,572, has been coated with alternating layers of $TiO_2/SnO_2/TiO_2/SnO_2/TiO_2$ and then calcined at 900° C. and which has a yellow interference color (platelet size 10 to 60 $\mu$m, mica content 50.8%, $TiO_2$ content 42.2%, $SnO_2$ content 7.0%) are suspended in 2.4 liters of water, and the suspension is heated to 75° C. The suspension is adjusted with 5% ammonia solution to pH 6.0, and a solution of 0.8 g of $KCr(SO_4)_2 \times 12H_2O$ in 30 ml of water is added in the course of 15 minutes. During this period, the pH is maintained at a constant value by the simultaneous addition of 5% ammonia solution. The batch is then stirred for a further 30 minutes at 75° C., and the solids are filtered off, washed, dried and calcined for 30 minutes at 800° C. A yellow-colored pigment having a golden lustrous color and a chromium content, calculated as $Cr_2O_3$, of 0.1% is obtained.

The same base pigment is coated in an analogous manner with amounts of chromium hydroxide which are such that, after calcination a $Cr_2O_3$ content of 0.5, 1.0, 4.0 and 8% is produced. It was found in a weathering test, in which the pigments, incorporated into PVC, are exposed to high humidity and UV light, that pigments coated with even only 0.1% of $Cr_2O_3$ discolor to a lesser extent than the base pigments and that hardly any discoloration is detectable at a $Cr_2O_3$ content of 0.5%. At the same time, it becomes apparent that products having a $Cr_2O_3$ content from 4% and above already have a markedly green tint.

EXAMPLE 2

A suspension of 120 g of the base pigment of Example 1 in 2.4 liters of water is heated to 75° C. and adjusted to pH. 6.2 with 5% ammonia solution. A solution of 4.0 g of $KCr(SO_4) \times 12H_2O$ in 50 ml of water is slowly added, the pH being maintained at a constant value by the simultaneous addition of 5% ammonia. After stirring for 30 minutes, half of the suspension is filtered and the solids filtered off are washed, dried and ignited for 30 minutes at 840° C. A solution of 1.5 g of $Na_2HPO_4 \times 12H_2O$ in 100 ml of water is added to the second half of the suspension. After 30 minutes the solids are filtered off, washed, dried and calcined for 30 minutes at 840° C.

The two preparations have a lively golden luster and contain about 0.5% of $Cr_2O_3$.

No difference between the two preparations can be detected in a light-fastness test, but both preparations are found to be markedly more light-fast than untreated preparations.

EXAMPLE 3

Muscovite having a platelet size of 5 to 200 $\mu$m is coated, according to the process of German Offenlegungsschrift No. 2,522,572, at 75° C. and at a pH value of 1 to 2.5, first with a $TiO_2$ layer of 5 nm thickness, then with an $SnO_2$ layer of 5–10 nm thickness and with a $TiO_2$ layer of 45–55 nm, then again with an $SnO_2$ layer of about 5nm and finally with $TiO_2$ until a yellow interference color is reached. The pH is then adjusted to a value of about 6 and, at the same time, a chromium(III) chloride solution as well as an ammonia solution are slowly added, whereby the pH is kept at a largely constant value of 6. After a chromium hydroxyide layer which corresponds to about 0.1% by weight of chromium oxide, relative to the total pigment, has been precipitated, the pigment is filtered off, washed, dried and calcined for 0.5 hour at 800° C.

The same base pigment is coated in an analogous manner with amounts of chromium hydroxide which are such that, after calcination, a $Cr_2O_3$ content of 0.5, 1.0, 4.0 and 8% is produced. It was found in a weathering test, in which the pigments incorporated into PVC, are exposed to high humidity and UV light, that pigments coated only with 0.1% of $Cr_2O_3$ discolor to a lesser extent than the base pigments and that hardly any discoloration is detectable at a $Cr_2O_3$ content of 0.5%. At the same time, it becomes apparent that products having a $Cr_2O_3$ content from 4% and above already have a markedly green tint.

Comparable results are obtained when $CrPO_4$ is used instead of $Cr(OH)_3$ in the coating and ignition is carried out thereafter.

EXAMPLE 4

45 g of muscovite having a platelet size of 10–60 $\mu$m is suspended in water and, according to the process of German Offenlegungsschrift No. 2,522,572, coated with alternating layers of $TiO_2/SnO_2/TiO_2$ until a silvery interference color is reached. The suspension is then adjusted with 10% sodium hydroxide solution to pH 6.0, and a solution of 0.44 g of $KCr(SO_4)_2 \times 12H_2O$ in 30 ml of water is slowly added, the pH being maintained at a constant value by the simultaneous addition of 5% ammonia solution. The solids are then filtered off, washed, dried and calcined for 30 minutes at 820° C. A silvery-lustrous pigment having a yellowish powder color and very good light-fastness, and which contains 0.2% of $Cr_2O_3$, is obtained.

EXAMPLE 5

45 g of muscovite having a platelet size of 10–60 $\mu$m is suspended in 1.5 liters of water and, in a manner which corresponds to the process of German Offenlegungsschrift No. 2,522,572, coated until a green interference color is reached. The suspension is then adjusted to pH 6.0 with 10% sodium hydroxide solution, and a solution of 1.8 g of $KCr(SO_4)_2 \times 12H_2O$ in 100 ml of water is slowly added, the pH being maintained at a constant value by a 5% ammonia solution being metered in. The pigment is then filtered off, washed, dried and calcined for 30 minutes at 800° C. A pigment having a yellow powder color, a greenish-yellow interference color and a $Cr_2O_3$ content of 0.3% is obtained.

EXAMPLE 6

45 g of muscovite having a particle size of 10 to 60 μm is suspended in 1.6 liters of water and, in a manner corresponding to the process of German Offenlegungsschrift No. 2,522,572, coated until a red interference color is reached. The suspension is then adjusted to pH 5.8, and a solution of 1.04 g of $KCr(SO_4)_2 \times 12H_2O$ in 60 ml of water is added, the pH being maintained at a constant value by the addition of 5% ammonia solution. The pigment is then filtered off, washed, dried and calcined for 30 minutes at 800° C. A red-lustrous pigment having a yellow powder color and a high light-fastness and containing 0.2% of $Cr_2O_3$ is obtained.

The preceding examples can be repeated with similar success by substituting the generically or specifically described reactants and/or operating of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nacreous pigment having a yellow powder color and an improved light-fastness comprising a mica platelet coated with a plurality of metal oxide layers, wherein the metal oxide layers comprise the sequence rutile/$SnO_2$/rutile and the outermost layer is rutile, and on the outermost rutile layer a thin layer of calcined chromium oxide as a protective layer, and in the chromium oxide layer a phosphate content of up to the stoichiometric amount based on the chromium content.

2. A nacreous pigment of claim 1, wherein the chromium content of the protective layer, calculated as $Cr_2O_3$, is about 0.2–3% by weight, relative to the total weight of the pigment.

3. A nacreous pigment of claim 1 wherein the protective layer is applied to the titanium dioxide layer by first applying a chromium hydroxide layer or a chromium phosphate layer thereto and then calcining the pigment at a temperature of about 500° to about 1000° C.

4. A nacreous pigment of claim 1 wherein the mica platelet is of a diameter of about 5–200 μm and a thickness of about 0.1 to 5 μm, and the titanium dioxide layer is of a weight of 50–500 mg/m².

5. A nacreous pigment of claim 1, wherein the chromium content of the protective layer is converted into chromium titanate during calcination.

6. A lustrous composition comprising a base composition in which it is desired to achieve a lustrous effect and an amount of a nacreous pigment of claim 1 effective to achieve a lustrous effect.

7. A lustrous composition of claim 6, wherein the base composition is a cosmetic formulation 8. A lustrous composition of claim 6 wherein the base composition is a car paint.

9. A process for preparing a yellow nacreous pigment having improved light-fastness and comprising a mica platelet coated with metal oxides, comprising
  (a) coating a mica platelet successively with at least three layers of titanium hydroxide, tin hydroxide and titanium hydroxide, the outermost layer being a titanium hydroxide layer, and optionally washing, drying and calcining the pigment,
  (b) coating this pigment with a thin layer of a sparingly soluble chromium (III) compound, which contains phosphate ions of up to the stoichiometric amount based on the chromium content, and then
  (c) calcining it at a temperature of about 500° to 1000° C.

10. A process of claim 9 wherein the sparingly soluble chromium(III) compound is applied in an amount which, after calcination, produces a chromium content, calculated as $Cr_2O_3$, of about 0.2 to about 3% by weight, relative to the total weight of the pigment.

11. A process of claim 9, wherein the sparingly soluble chromium(III) compound is chromium hydroxide and/or chromium phosphate.